Sept. 24, 1968  M. D. PETROFF  3,403,257
LIGHT BEAM DEMODULATOR

Filed April 2, 1963  3 Sheets-Sheet 1

INVENTOR.
MICHAEL D. PETROFF
BY
ATTORNEYS

United States Patent Office 3,403,257
Patented Sept. 24, 1968

---

3,403,257
LIGHT BEAM DEMODULATOR
Michael D. Petroff, Los Angeles, Calif., assignor, by mesne assignments, to McDonnell Douglas Corporation, Santa Monica, Calif., a corporation of Maryland
Filed Apr. 2, 1963, Ser. No. 270,042
9 Claims. (Cl. 250—199)

This invention relates to laser communication systems, and more particularly to arrangements for demodulating a laser beam employed in such systems.

The recent development of particular apparatus capable of generating so-called "coherent" electromagnetic radiation in the optical frequency region has opened a wide variety of possibilities of use of such devices. Of particular interest, among such possibilities, is the area of communication. Laser (acronymically derived from light amplification by stimulated emission of radiation) beams have a frequency, or wave length, corresponding to light radiation, which encompasses the range from infra-red to ultra-violet. Because of its very high frequency, such radiation has an enormous capacity for transmitting information as carrier modulation. However, unlike the radiant energy from a conventional light source, a laser beam comprises coherent radiation which permits the beam to be focused to a degree which is impossible with ordinary light. Thus, a laser beam communication system is virtually eavesdrop proof, unlike radio communication systems. Furthermore, a so-called laser light source produces radiation which is extremely monochromatic with a high degree of stability. All of these factors are of considerable importance in any communication system which is to depend upon light as the medium of transmission and thus it can be seen that the laser is of considerable interest in this area.

Any communication system which utilizes a carrier to transmit modulated intelligence requires modulating and demodulating equipment as part of the system. Experiments have already demonstrated the possibility of modulating a laser beam at selected frequencies. Of particular interest is the potentiality of modulating laser beams with signals in the X-band microwave region, as these are near the upper limit of frequencies which can be generated and amplified by more conventional apparatus. However, the detection of modulation signals at such frequencies which may be present in a laser beam by demodulating the beam presents a number of problems which have not been entirely solved by previously known developments.

Accordingly, it is a general object of the present invention to provide an improved demodulator for a laser beam communication system.

It is a particular object of the present invention to provide a laser beam demodulator capable of efficiently deriving modulated information from an incident laser beam.

It is a more particular object of the present invention to provide a laser beam demodulator capable of detecting microwave signal modulation which may be present in a laser beam.

It is also an object of the present invention to provide useful microwave energy in response to a modulated laser beam.

In brief, arrangements in accordance with the present invention comprise a photo-emissive electron beam source and a microwave interacting structure coupled to the resulting electron beam. The arrangement is disposed to receive energy from a laser beam and to provide microwave energy in correspondence therewith. In particular, the modulated laser beam is directed to the photosensitive electron beam source where an electron beam is developed which is modulated in accordance with the modulation of the laser beam. The electron beam is directed to the microwave interacting structure where microwave radiation is generated in interaction with the electron beam. The microwave energy is thereafter amplified and supplied to utilization devices for further processing of the microwave signals.

In one specific embodiment of the present invention, a beam re-entrant arrangement is provided wherein both the laser beam and the electron beam are arranged to pass through the microwave interacting structure. The interacting structure may be in the form of a wave guide section having a pair of hollow re-entrant cones affixed to opposite walls. The wave guide section is evacuated along with the associated enclosure of the electron beam structure. In accordance with an aspect of the invention, an incident laser beam is focused to pass through a beam tunnel formed by the hollow cones to impinge upon and illuminate the photosensitive cathode of the electron beam source. By focusing the laser beam in this manner, it is possible to illuminate the cathode with light of uniform phase over a substantially extended area, thus increasing the total current of uniform phase which is available for the electron beam. The resultant electron beam is focused by an electron gun to pass back over substantially the same path through the beam tunnel in the wave guide section. The beam tunnel includes an interaction gap defined by the spacing between the tips of the hollow cones, and the electron beam in passing through this gap develops a coupling with the wave guide section which generates a microwave signal in accordance with the beam current fluctuations which in turn correspond to the modulation of the laser beam. After having passed through the wave guide, the electron beam current is collected on a collector electrode. The resulting microwave signal may later be amplified and utilized as desired.

In a second specific embodiment of the present invention, structure is provided for permitting the development of a plurality of microwave signals in response to a single incident laser beam. In this particular arrangement, a transparent cathode with a photo-emissive surface is arranged to emit electrons in response to an incident laser beam impinging upon the back side thereof opposite the surface from which electrons are emitted. A pair of wave guide sections which may have different pass bands for response to different frequencies are arrayed in line with the focused electron beam so that the electron beam passes through the interactions gaps of both sections. Thus, microwave energy is generated in each of the wave guide sections in response to the modulation of the laser beam which may be processed independently from the other. Assuming that the laser beam may be modulated with a plurality of distinct microwave signals or channels, the different wave guide sections may be separately tuned to the respective modulation signals so as to provide the desired demodulation and separation. It will be clear that such an arrangement is not limited to only two such wave guide sections, but rather additional sections may be interposed as desired for coupling to the electron beam in the manner described.

A better understanding of the present invention may be had from a consideration of the following detailed description, taken in conjunction with the accompanying drawings, in which.

Figure 1:
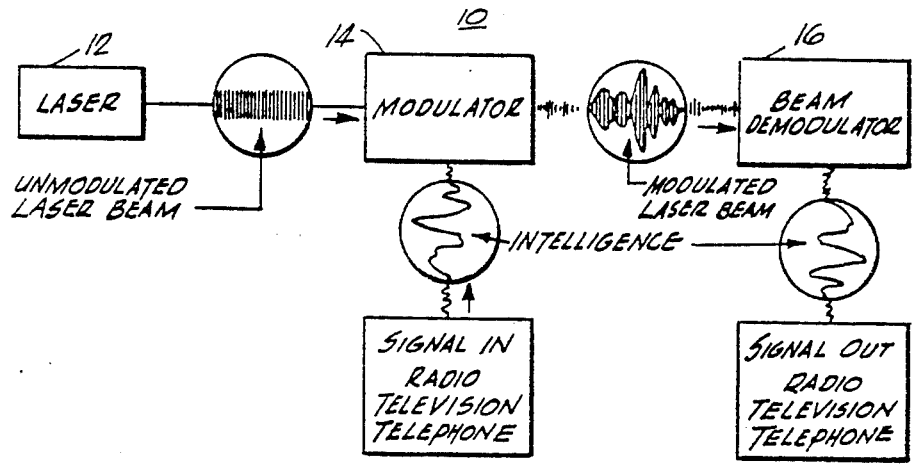
FIG. 1 is a block diagram of a communication system in which the present invention may be employed.

The major elements of a laser communication system 10 are represented in block form in FIG. 1. As shown, a laser 12 is employed to develop a beam which is then modulated in a modulator 14 by suitable intelligence signals which may, for example, be derived from conventional radio, television, telephone, or other sources. For example, the laser beam may be modulated in amplitude, as shown, or in frequency to impress the communication signals thereon at the point of origin. After transmission and reception, the modulated laser beam is directed to a beam demodulator 16 for demodulation at the receiving end which develops an output signal in response to the laser beam modulation corresponding to the input signal at the transmitting end.

In modulated carrier systems, the capacity of the carrier in number of messages carried is a function of a ratio of the carrier frequency to the frequency of the modulating signal. Visible light has frequencies from 400 to 750 trillion cycles per second. By comparison, television transmissions require a channel of approximately 6 megacycles or only about 1/100 millionth of the laser beam frequency. Thus, a single laser beam is theoretically capable of carrying 100 million television programs, each in a different 6-megacycle band superimposed upon the laser beam. A laser communication system realizing anywhere near the theoretical capability of laser beam communication gives promise of materially reducing the amount of equipment required, with a resulting reduction in the cost and complexity of the overall system.

Figure 2:
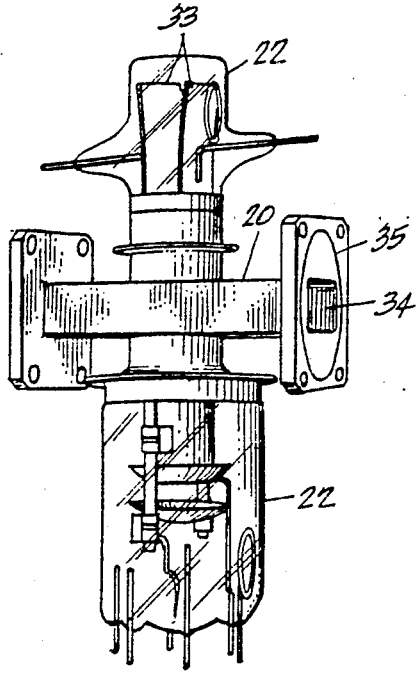
FIG. 2 is a perspective view of one particular arrangement of the invention suitable for use in the laser communication system of FIG. 1.
Figure 3:
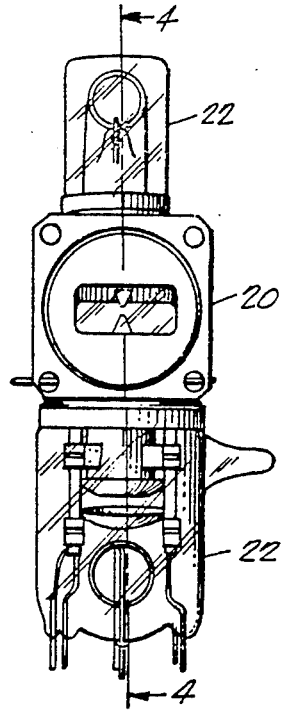
FIG. 3 is another view of the arrangement of the invention shown in FIG. 2 showing the interior of the wave guide portion thereof.
Figure 4:
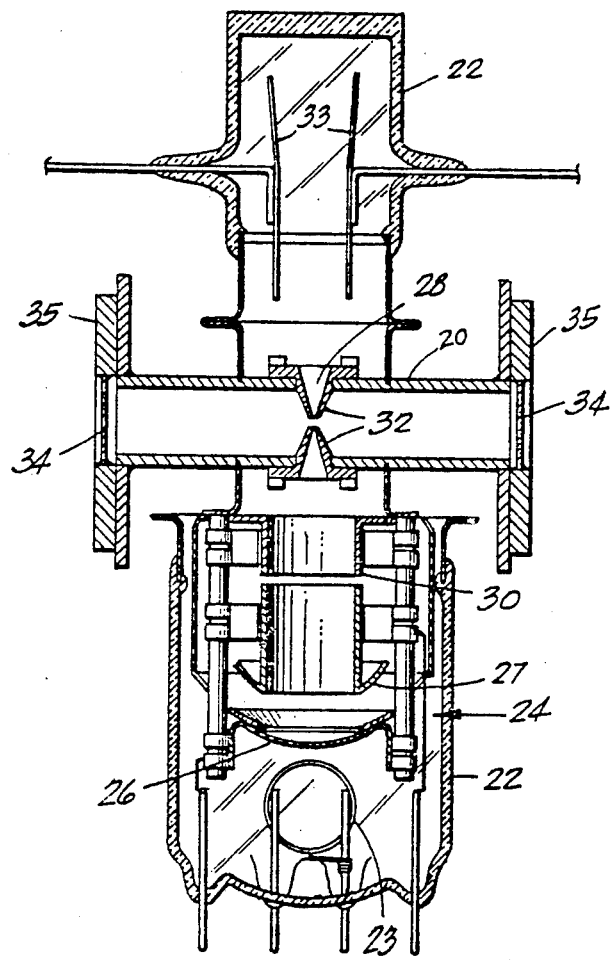
FIG. 4 is a sectional view of the arrangement of the invention depicted in FIGS. 2 and 3 taken along the line 4—4 of FIG. 3.

In the particular arrangement of the present invention which is shown in FIGS. 2 and 3, and of which FIG. 4 represents a detailed sectional view, a microwave interacting structure in the form of a wave guide section 20 is shown attached to an associated vacuum tube structure 22. The vacuum tube structure 22 encloses principally an electron gun 24, including a photo-emissive cathode 26, for providing an electron beam which is directed through a beam tunnel 28 extending through the wave guide 20. The electron gun 24 comprises the cathode 26 and a first anode 27. The cathode 26 is arranged in a spherical configuration in order that an electron beam of sufficient current amplitude may be obtained from a photo-emissive surface which in general is limited to a relatively low maximum current density. Although pulsed beam lasers are presently more common, the beam demodulator of the present invention is suitable for use with continuous wave lasers as well as those of the pulsed beam type.

The interaction gap by which the focused electron beam from the electron gun 24 generates microwave energy within the wave guide 20 extends between the points of a pair of hollow re-entrant cones 32 extending from opposite walls of the wave guide 20. In the depicted structure, the electron beam terminates on collecting plates 33 located within the vacuum tube structure on the opposite side of the wave guide interaction gap from the electron gun 24.

In order that field strength at the photo-emissive surface of the cathode 26 is not excessive, the potential difference between the cathode 26 and the first anode 27 is limited to approximately 200 volts. The electron beam thus produced is only slightly convergent. The beam is focused and brought up to the required potential of approximately 2000 volts which serves to carry it through the interaction gap in the wave guide section 20 by virtue of the strong focusing action provided by the accelerating gap established between the first anode 27 and an accelerating anode 30. With a potential difference of about 1800 volts maintained across the accelerating gap, the beam is properly focused to pass through the small apertures in the cones 32 of the interacting structure of the wave guide 20.

The wave guide section 20 is provided with mica windows 34 at opposite ends thereof in order to provide the desired sealing effect which permits the evacuation of the entire wave guide and vacuum tube combination. Although the mica windows 34 are extremely sensitive to shock or stress, the exercise of proper care in fabrication, including the use of a large copper heat sink during the heliarc welding of the windows 34 to the flanges 35 to minimize thermal shock, results in a structure which is leak proof and provides the desired high vacuum arrangement. The vacuum tube structure 22 is provided with a barium getter 23 to insure longer life without deterioration from gas diffusion.

Figure 5:
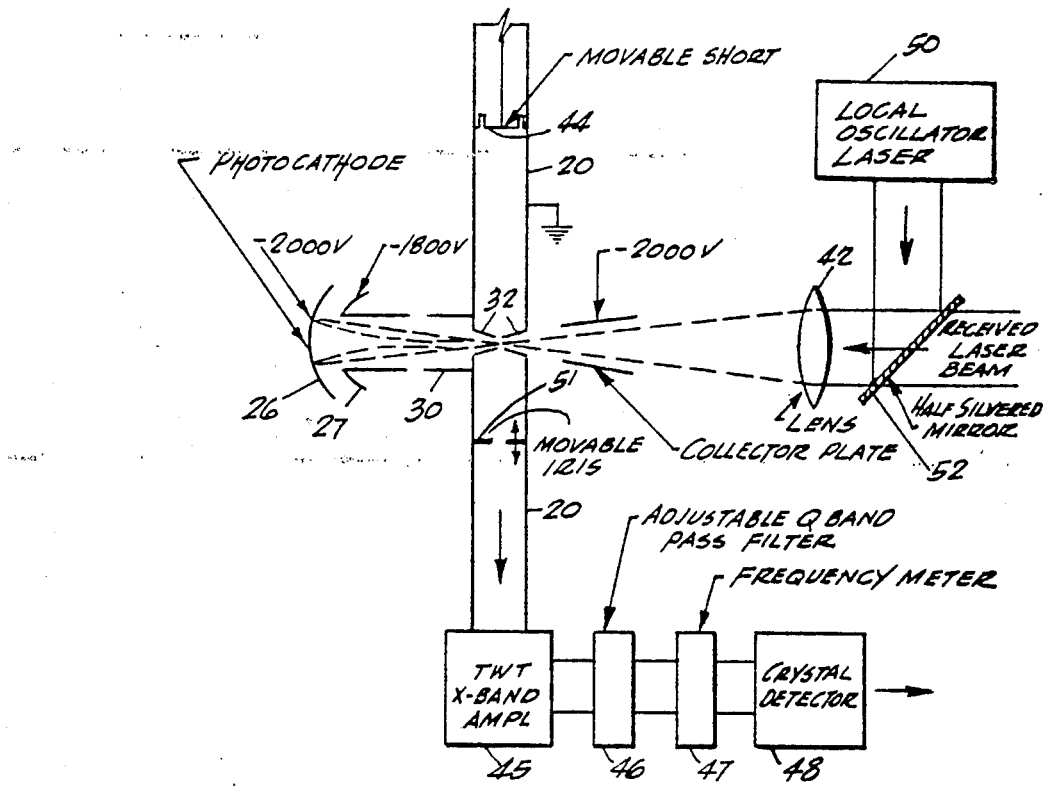
FIG. 5 is a schematic representation showing associated equipment which may be employed in operating the depicted arrangements of the present invention.

Particular apparatus which may be employed in operating arrangements in accordance with the present invention as a laser beam demodulator is represented in the block diagram of FIG. 5. As indicated, a laser beam which is assumed to carry a modulated signal is focused by a focusing lens 42 so that it converges at the interaction gap of the two hollow re-entrant cones 32 and passes therethrough to illuminate the surface of the photocathode 26. In the arrangement of the invention depicted in FIGS. 2-5, illumination of the photocathode in this manner is desirable, since in the depicted arrangement, the material of the cathode 26 on which a photosensitive surface is deposited is opaque. By focusing the laser beam by means of a lens 42 in this manner, the beam can be made to pass through the small openings of the re-entrant cones 32 while at the same time illuminating a substantial area of the photocathode 26 to develop the desired electron beam. Should the incident laser beam be amplitude modulated, the resultant electron beam is intensity modulated by virtue of the response of the photo-emissive cathode 26, and a corresponding microwave signal is thus produced within the wave guide section 20. If, however, the received laser beam is frequency modulated, demodulation may be accomplished by introducing a second laser beam from a local oscillator laser 50 by way of a half-silvered mirror 52, resulting in a heterodyning action which relies on the inherent non-linearity in the response characteristic of the photo-emissive surface of the cathode 26 to produce a photocurrent, and resultant electron beam, which is thus a function of the degree of frequency variation encountered in the laser beam. Therefore, in either type of modulation, en electron beam is provided which presents an appropriate variation in intensity corresponding to the signal modulated on the laser beam.

In the particular arrangement represented in FIG. 5, the wave guide section 20 is shown incorporating a movable shorting element 44 which is provided for controlling the power derived from the wave guide for a given input signal. In addition, a movable iris 51 or other movable and tunable mismatch element may be provided for controlling the response of the wave guide section over a limited frequency range. After the microwave energy is generated within the wave guide 20 by virtue of the coupling to the electron beam provided by the interaction gap of the re-entrant cones 32, the microwave signal is applied to a traveling wave tube amplifier 45 tuned to radiation in the X-band region. After suitable amplification, the microwave signal can be applied to a utilization device which, in the arrangement shown, comprises an adjustable band pass filter 46, a frequency meter 47, and a crystal detector 48 in series which may be adjusted to select between various signal frequencies within the range of microwave radiation coupled into the wave guide section 20. The crystal detector 48, coupled in the manner shown, provides an output signal which may be utilized as desired. Thus, a complete arrangement is illustrated for utilizing the dveice of the present invention as a demodulator for transforming a modulated laser beam to a useful microwave signal.

Figure 6:
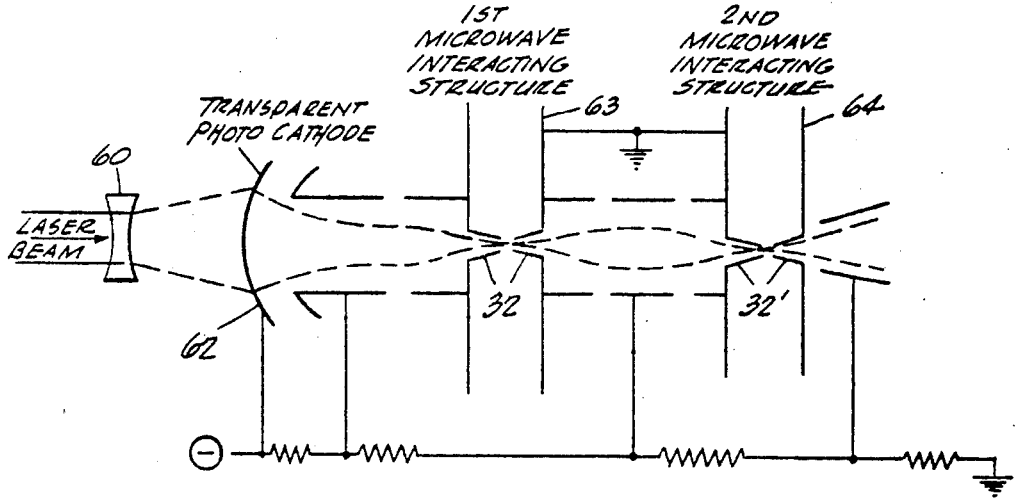
FIG. 6 is a schematic representation of a second particular arrangement in accordance with the present invention.

A second particular arrangement in accordance with the present invention is represented in FIG. 6 wherein a photocathode 62 is shown in conjunction with a pair of microwave interacting structures 63 and 64. In this arrangement the photocathode 62 is arranged to be transparent and a laser beam is shown passing through a lens system 60 to impinge upon the back side of the photocathode 62. The laser beam passes through the photocathode 62 to induce emission of electrons from the photoelectric surface thereof. The emitted electrons are focused and directed in the manner already described to pass through the interaction gap defined by the hollow re-entrant cones 32 of the microwave structure 63, after which the beam is again focused and directed to pass through the interaction gap of a second pair of re-entrant cones 32' of the second microwave structure 64. Each of the microwave cavities shown, 63 and 64, may be employed to provide demodulation at a slightly different frequency band. For example, the structure 63 may be designed for operation in the X-band microwave region while the structure 64 may be designed for operation in the S-band region. Additional stages of demodulation may be provided, if desired, by additional microwave structures which may be inserted along the path of the photo-emitted electron beam if desired.

By employing the structures described above in accordance with the present invention, a relatively simple yet extremely effective arrangement may be achieved for the demodulation of an incident laser beam or any similar incident radiation capable of inducing electron emission in the manner described. The incident beam may be converted to usable microwave signals corresponding to modulation carried by the beam.

There have thus been described particular arrangements of a laser beam demodulator in accordance with the present invention in order to better illustrate the preferred embodiments thereof. It should be understood, however, that these are by way of example only and are not intended to limit the scope of the present invention. Rather, the present invention is intended to include all variations, modifications and particular arrangements thereof encompassed by the annexed claims.

What is claimed is:

1. An arrangement for converting modulated coherent light energy to microwave radiation comprising a microwave interacting structure, an electron beam source, means for applying a modulated coherent light beam through the interacting structure to control the electron beam source, and means for coupling the resultant electron beam to the interacting structure to generate electromagnetic radiation therein.

2. A light beam demodulator comprising a microwave interacting structure, an electron beam source, means for applying a coherent light beam through the interacting structure to vary the intensity of the electron beam from said source in accordance with modulated variations in said light beam, means for coupling the electron beam to the interacting structure to generate electromagnetic radiation therein, and output means coupled to said structure for receiving said electromagnetic radiation.

3. A light beam demodulator comprising a microwave interacting structure, means for tuning the resonant frequency of the structure over a predetermined range, an electron beam source, means for applying a coherent light beam through the interacting structure to vary the intensity of the electron beam from said source in accordance with modulated variations in said light beam, means for coupling the electron beam to the microwave interacting structure to generate electromagnetic radiation therein, and output means coupled to said structure for receiving said electromagnetic radiation.

4. A light beam demodulator comprising a tunable wave guide section having a pair of hollow re-entrant cones affixed to opposite walls of the section and defining an interaction gap between the narrow ends of the cones, an electron beam source, means for applying a coherent light beam to vary the intensity of the electron beam from said source in accordance with modulated variations in said light beam, means for coupling the electron beam to the wave guide section to generate electromagnetic radiation therein, and output means coupled to said section for receiving said electromagnetic radiation.

5. A light beam demodulator in accordance with claim 4 wherein the wave guide section is tunable in the X-band microwave region and in which said hollow cones are disposed with their narrow end openings adjacent each other and providing an interaction gap of approximately .025 inch with cone aperture diameters of approximately .045 inch at said gap.

6. A light beam demodulator in accordance with claim 4 wherein said wave guide section and electron beam source are arranged for the transmission of both the incident light beam and the corresponding electron beam through said interaction gap.

7. A light beam demodulator in accordance with claim 4 arranged to receive incident light on the opposite side of said photosensitive cathode from which electrons are emitted, wherein the electron beam is focused to pass through the interaction gap of said wave guide section.

8. A light beam demodulator in accordance with claim 7 further including an additional wave guide section also having an interaction gap and means for directing said electron beam through each of said wave guide sections in succession.

9. A light beam demodulator in accordance with claim 8 wherein each of said wave guide sections operates in a different microwave frequency band.

References Cited

UNITED STATES PATENTS

| 2,450,026 | 9/1948 | Tomlin | 325—447 X |
| 3,154,748 | 10/1964 | Javan et al. | 250—199 |
| 3,231,741 | 1/1966 | Siegman | 250—199 |
| 3,231,742 | 1/1966 | Siegman | 250—199 |

OTHER REFERENCES

Forester et al.: Physical Review, vol. 99, No. 6, Sept. 15, 1955, pp. 1691–1700.

RALPH G. NILSON, *Primary Examiner.*

M. A. LEAVITT, *Assistant Examiner.*